(12) United States Patent
Anbazhagan et al.

(10) Patent No.: US 8,312,256 B2
(45) Date of Patent: Nov. 13, 2012

(54) DISPLAY OF A BASIC INPUT/OUTPUT SYSTEM (BIOS) PRODUCTIVITY DISPLAY

(75) Inventors: Baraneedharan Anbazhagan, Houston, TX (US); Lan Wang, Houston, TX (US); Jon Liu, Houston, TX (US); Dong Wei, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 12/711,498

(22) Filed: Feb. 24, 2010

(65) Prior Publication Data

US 2011/0208955 A1  Aug. 25, 2011

(51) Int. Cl.
*G06F 9/00* (2006.01)
*G06F 11/00* (2006.01)
*G06F 15/177* (2006.01)

(52) U.S. Cl. ............ 713/2; 713/1; 714/24; 714/36
(58) Field of Classification Search ............ 713/1, 2; 714/24, 36
See application file for complete search history.

(56) References Cited

U.S. PATENT DOCUMENTS

| | | | | |
|---|---|---|---|---|
| 5,596,711 A * | 1/1997 | Burckhartt et al. | | 714/23 |
| 6,189,114 B1 * | 2/2001 | Orr | | 714/25 |
| 7,017,085 B2 * | 3/2006 | Braun | | 714/47.3 |
| 7,231,547 B2 | 6/2007 | Moiroux | | |
| 8,140,838 B2 * | 3/2012 | Ha | | 713/1 |
| 2008/0046613 A1 * | 2/2008 | Lai et al. | | 710/58 |
| 2008/0215868 A1 | 9/2008 | Lee et al. | | |
| 2008/0270776 A1 | 10/2008 | Totolos et al. | | |

FOREIGN PATENT DOCUMENTS

| | | |
|---|---|---|
| CN | 1996260 A | 7/2007 |
| TW | 200725257 A | 7/2007 |

OTHER PUBLICATIONS

Laurie, Safe Mode in Windows XP, Feb. 9, 2009, http://web.archive.org/web/20090209014102/http://vlaurie.com/computers2/Articles/safemode.htm.*
Ackerman, New biz systems from HP's EliteBook line follow the 'lightweight' trend, Aug. 18, 2008, http://news.cnet.com/8301-17938_105-10018932-1.html.*

* cited by examiner

*Primary Examiner* — Mark Connolly
(74) *Attorney, Agent, or Firm* — Scott A. Pojunas (57) ABSTRACT

Example embodiments relate to a machine-readable storage medium encoded with instructions executable by a processor of a computing device including a display device. The machine-readable storage medium may include instructions that access a stored indication upon boot-up of the computing device using a Basic Input Output System (BIOS). In addition, the machine-readable storage medium may include instructions that determine, using the stored indication, whether an operating system (OS) of the computing device exited properly, and instructions that display a BIOS productivity display using the display device when it is determined that the computing device exited properly. Still further, the machine-readable storage medium may include instructions that permit the OS to display a recovery display when it is determined that the OS did not exit properly.

14 Claims, 6 Drawing Sheets

DISPLAY OF A BASIC INPUT/OUTPUT SYSTEM (BIOS) PRODUCTIVITY DISPLAY

BACKGROUND

A typical computing device, such as a desktop computer, laptop computer, or handheld device, includes a Basic Input/Output System (BIOS), which is used to configure hardware and load the operating system (OS) upon boot-up of the device. More specifically, upon boot-up, a processor loads and executes a set of BIOS instructions to identify, test, and initialize hardware installed in the device. Such hardware includes, for example, the hard disk, system memory, display devices, network devices, and the like.

After each hardware device is initialized, the BIOS may then initiate loading of the OS from a hard disk or other non-volatile memory. As an example, the BIOS may read a predetermined location on a hard disk to access boot code, which loads the OS software components into system memory. After all necessary components of the OS are loaded into memory, the BIOS may then pass execution to the OS, such that the user of the computing device may interact with the OS to load and execute applications.

During the period between passing of execution to the OS by the BIOS and loading of a display device driver by the OS, both the OS and the BIOS may desire to output information to the user using the display device, such as a video card. Such a competition for the display may be problematic, particularly when either the BIOS or the OS has information that is useful for the user or even required by the user to operate the computing device.

BRIEF DESCRIPTION OF THE DRAWINGS

In the accompanying drawings, like numerals refer to like components or blocks. The following detailed description references the drawings, wherein.

DETAILED DESCRIPTION

As detailed above, during the period between the passing of execution to the OS by the BIOS and the loading of a display device driver by the OS, the OS and BIOS may both desire to display information to the user. As described below, various embodiments relate to a computing device and related storage medium and method that enable selective output of either a BIOS productivity display or an OS recovery display depending on whether the OS exited properly prior to the current boot-up.

In particular, in some embodiments, the computing device may determine whether the OS exited properly by accessing a stored indication upon boot-up. In situations in which the OS did not exit properly and the OS therefore requires access to the display device to output a recovery display, the BIOS will permit the OS to access the display device. In contrast, when the OS exited properly prior to the current boot-up, the computing device may determine that the OS does not require access to the display device and therefore output a BIOS productivity display. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.). Furthermore, as used herein, it should be understood that the term "BIOS" refers to a legacy Basic Input/Output System, a Unified Extensible Firmware Interface (uEFI) BIOS, or any other BIOS implementation that will be known to those of skill in the art.

Figure 1:
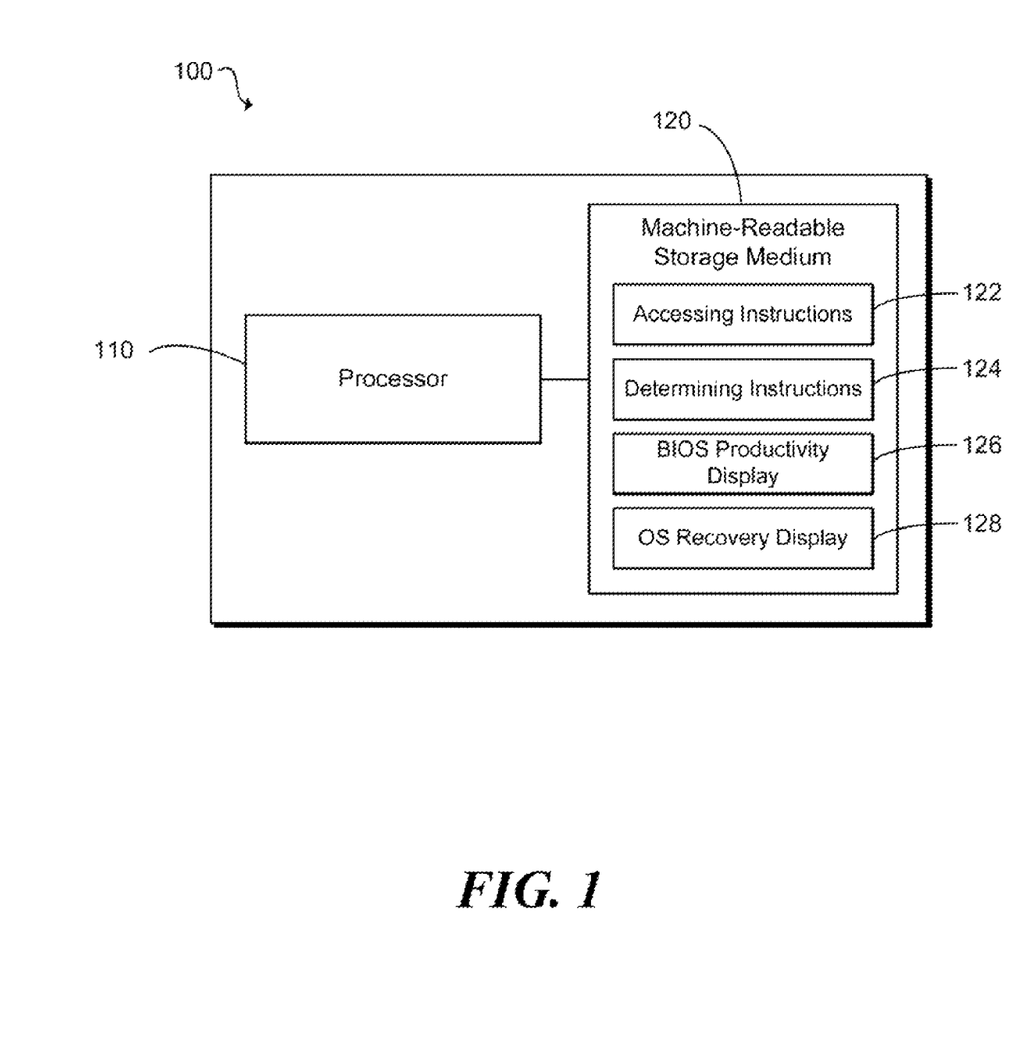
FIG. 1 is a block diagram of an example of a computing device including a machine-readable storage medium encoded with instructions for displaying a BIOS productivity display or permitting an OS to display a recovery display.

Referring now to the drawings, FIG. 1 is a block diagram of an example of a computing device 100 including a machine-readable storage medium 120 encoded with instructions for displaying a BIOS productivity display or permitting an OS to output a recovery display. Computing device 100 may be, for example, a desktop computer, a laptop computer, a server, a handheld computing device, or the like. In the embodiment of FIG. 1, computing device 100 includes a processor 110 and a machine-readable storage medium 120.

Processor 110 may be a central processing unit (CPU), a semiconductor-based microprocessor, or any other hardware device suitable for retrieval and execution of instructions stored in machine-readable storage medium 120. In particular, processor 110 may fetch, decode, and execute accessing instructions 122, determining instructions 124, and displaying instructions for displaying a BIOS productivity display 126 and an OS recovery display 128.

Machine-readable storage medium 120 may be an electronic, magnetic, optical, or other physical device that contains or stores executable instructions for selectively displaying either a BIOS productivity display 126 or an OS recovery display 128. In some embodiments, machine-readable storage medium 120 is a non-volatile memory device that stores both the BIOS and the operating system (OS) of computing device 100. Alternatively, the BIOS may be stored on a first machine-readable storage medium 120, while the OS may be stored on a second, distinct machine-readable storage medium.

Regardless of the particular implementation, machine-readable storage medium 120 may include accessing instructions 122 for execution upon boot-up of computing device 100. Boot-up of computing device 100 may be triggered in a number of ways, including, for example, power-up of the device, restarting of the device, and awakening from a "hibernation" or "sleep" mode. Thus, boot-up of computing device 100 may include any situation in which the BIOS initializes or configures hardware devices to enable operation of computing device 100.

Upon boot-up of computing device 100, accessing instructions 122 may be executed by the BIOS to access a stored indication. The stored indication may be, for example, a Boolean value, a single or multi-bit binary value, a string of text, or any other data type that is capable of representing multiple states. The indication may be stored in any location accessible to computing device 100, provided that the BIOS may access the indication and determine its current value. Thus, the indication may be stored on machine-readable storage medium 120, in a Complementary Metal Oxide Semiconductor (CMOS) accessible to the BIOS, or in any other storage medium.

Determining instructions 124 may then determine, using the stored indication, whether the OS of the computing device exited properly prior to the current boot-up. As one example, determining instructions 124 may determine whether the value of the indication has been modified since last set by the BIOS. Thus, assuming that the OS modifies the value of the indication only upon a proper exit, the BIOS may determine that the OS properly exited when the value has changed. In contrast, if the OS did not exit properly due to, for example, loss of power, battery failure, or manual restart or power-down by the user, the OS will not modify the indication and the BIOS will determine that the OS did not properly exit.

As a specific example, the stored indication may be a one-bit value that is initialized to "1" upon a first boot-up by the BIOS. Upon a proper exit from the OS of computing device 100, a procedure called by the OS may modify the value to "0." In contrast, should the OS improperly exit, this procedure would not be called and the value of the stored indication would remain "1." Upon the next boot-up of the computing device, the BIOS may then execute accessing instructions 122 to access the indication and execute determining instructions 124 to determine whether the OS exited properly.

Machine-readable storage medium 120 may further include instructions for displaying a BIOS productivity display 126 when it is determined that the OS exited properly prior to the current boot-up. BIOS productivity display 126 may include any text and/or images of utility or aesthetic value to the user of computing device 100. As one example, BIOS productivity display 126 may include information regarding computing device 100, such as a manufacturer and model number, an amount of storage space remaining on each disk drive, and the like. Similarly, BIOS productivity display 126 may include a calendar, a clock with a current time in one or more locales, a picture or other background, a technical support number, and the like.

In some embodiments, the text and/or images displayed in BIOS productivity display 126 may be customized for a user of computing device 100. For example, BIOS productivity display 126 may include a calendar with appointments of the particular user, a countdown to a user-specified date, a user's to-do list or shopping list, or similar information. In addition or as an alternative, BIOS productivity display 126 may include one or more pictures or other images identified by the user. In situations in which multiple users access computing device 100, the BIOS may allow for identification of the user prior to output of the customized BIOS productivity display 126 using, for example, a user selection menu.

In addition, in some embodiments, the customized information displayed in BIOS productivity display 126 may be obtained during operation of the OS of computing device 100. As one example, when BIOS productivity display 126 includes a calendar, the OS or an application running in the OS may obtain data and/or an image of the calendar by capturing the information while a calendar application is executing in the OS. Such a data capture may be accomplished, for example, through the use of a screenshot API accessible in the operating system. Alternatively, a user may manually enter or specify the contents to be displayed by BIOS productivity display 126. For example, a user may enter a to-do list or other textual information using a BIOS productivity application accessible in the OS. Other suitable methods for obtaining customized information for display in BIOS productivity display 126 will be apparent to those of skill in the art.

Machine-readable storage medium 120 may also include instructions for permitting the OS to display a recovery display 128 when it is determined that the OS did not exit properly prior to the current boot-up. In particular, because the user may be prompted to select one or more items from a menu, be informed that an error has occurred, or otherwise receive information from the OS, these instructions may permit the OS access to a display device of computing device 100. For example, the BIOS may allow the OS access to the display device through the use of interrupt requests, such as an INT 10 interrupt. In particular, by sending such an interrupt to the BIOS, the OS may control the display device prior to loading drivers for the display device.

As an example of the content displayed, the recovery display 128 may include a selection of options to be presented to the user for rebooting of the OS (e.g., restore in safe mode, boot normally, etc.) or options for repairing or otherwise restoring the operating system. Other suitable content for inclusion in recovery display 128 will be apparent to those of skill in the art.

In this manner, through the combination of accessing instructions 122 and determining instructions 124, computing device 100 may determine whether to display BIOS productivity display 126 or to permit display of OS recovery display 128. Advantageously, such instructions allow for computing device 100 to output a BIOS productivity display containing information useful to the user under normal circumstances, while ensuring that the OS may display recovery information when the OS did not exit properly.

Figure 2:
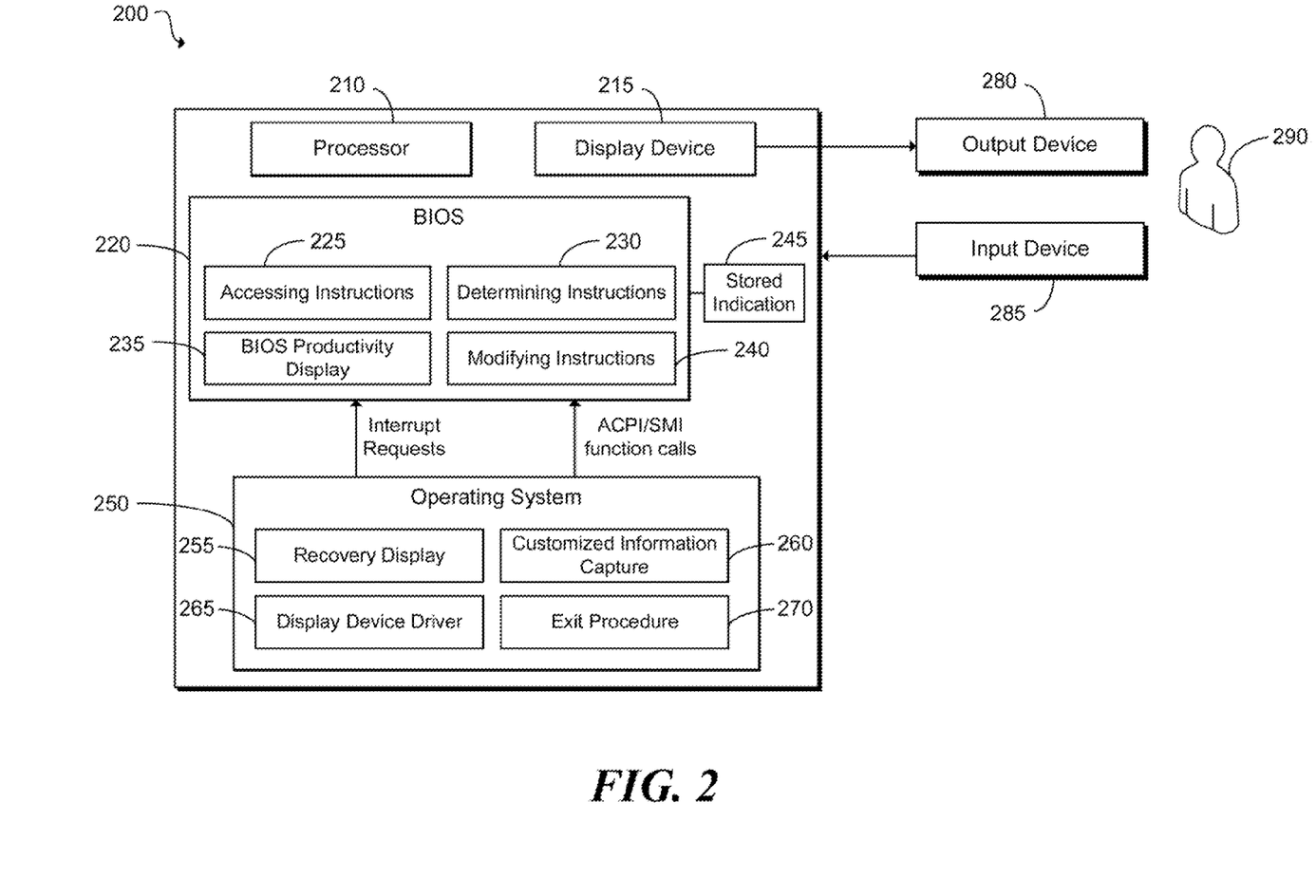
FIG. 2 is a block diagram of an example of a computing device including a processor, a display device, and a number of instructions in a BIOS and an OS of the computing device for displaying a BIOS productivity display or a recovery display.

FIG. 2 is a block diagram of an example of a computing device 200 including a processor 210, a display device 215, and a number of instructions in a BIOS 220 and an OS 250 of the computing device 200 for displaying a BIOS productivity display 235 or a recovery display 255. Computing device 200 may be, for example, a desktop computer, a laptop computer, a server, a handheld computing device, or the like.

As with processor 110 of FIG. 1, processor 210 may be a central processing unit (CPU), a semiconductor-based microprocessor, or any other hardware device suitable for retrieval and execution of instructions stored in a machine-readable storage medium of computing device 200. In particular, processor 210 may fetch, decode, and execute the instructions included in BIOS 220 and operating system 250.

Display device 215 may be any hardware device included in computing device 100 for output of information to an output device 280. Thus, display device 215 may be an onboard video chipset, a video card, or any similar hardware device capable of displaying information to output device 280. BIOS 220 may include instructions for enabling basic functions of display device 215, which may be used by either BIOS 220 or by OS 250 through the use of BIOS interrupt functions. In addition, OS 250 may include instructions for loading and configuring a display device driver 265 for display device 215. As described in further detail below, OS 250 may load the display device driver 265 during boot-up of computing device 200 after BIOS 220 has passed execution to OS 250.

BIOS 220 may include a series of instructions stored on a machine-readable storage medium (e.g., a Read Only Memory (ROM) chip or a flash memory device). These instructions may identify, test, and initialize hardware devices included in computing device 200, such as processor 210 and display device 215. Thus, upon boot-up of computing device 200, BIOS 220 may run a series of procedures to prepare computing device 200 for execution of OS 250. In some embodiments, BIOS 220 may include accessing instructions 225, determining instructions 230, instructions for displaying BIOS productivity display 235, and modifying instructions 240.

As described in detail above in connection with FIG. 1, accessing instructions 225 may access stored indication 245, while determining instructions 230 may determine whether OS 250 exited properly using the value of stored indication 245. When it is determined that OS 250 exited properly prior to the current boot, BIOS 220 may output BIOS productivity display 235, which, as described above in connection with FIG. 1, may include a variety of text and/or images.

In order to ensure that productivity display 235 remains visible to the user for as long as possible, the instructions for displaying BIOS productivity display 235 may include instructions for maintaining control of the display by ignoring requests from OS 250 to access display device 215 until OS 250 has loaded and initialized a driver 265 for display device 215. For example, after execution has passed to OS 250, but before loading of a display device driver 265, OS 250 may attempt to display a splash screen or other information using BIOS interrupt functions. When it is determined that BIOS productivity display 235 may be outputted (i.e., that the OS exited properly prior to the current boot), BIOS 220 may trap or ignore any interrupt requests from OS 250 seeking access to display device 215.

Stored indication 245 may be stored on any machine-readable storage medium accessible to accessing instructions 225 and modifying instructions 240 of BIOS 220. Thus, as an example, stored indication 245 may be maintained on a Complementary Metal-Oxide Semiconductor (CMOS) chip powered by a battery. It should be noted, however, that any non-volatile machine-readable storage medium may maintain stored indication 245, including, for example, a hard disk drive or a flash memory storage device. When stored in a storage medium of computing device 200, stored indication 245 may be located in any predetermined location, provided that accessing instructions 220 and modifying instructions 240 are aware of this location.

Operating system 250 may include a series of instructions stored on a machine-readable storage medium (e.g., a hard disk or solid state drive of computing device 200). These instructions may manage allocation of hardware resources, run applications, and interact with user 290 of computing device 200. In some embodiments, OS 250 may include instructions for displaying recovery display 255, instructions for customized information capture 260, a display device driver 265, and instructions for an exit procedure 270.

As described in detail above in connection with FIG. 1, recovery display 255 may include a selection of options to be presented to the user for rebooting of OS 250 or options for repairing or otherwise restoring OS 250. Output of recovery display 255 may be triggered by OS 250 upon a determination that OS 250 did not exit properly. In particular, in the event of such a determination, OS 250 may access display device 215 using BIOS interrupt functions. As an example, OS 250 may first write parameters to one or more registers accessible to BIOS 220 to specify the information to be included in recovery display 255. OS 250 may then call one or more display interrupt functions (e.g., INT 10 functions) to trigger output of recovery display 255 by display device 215 using the parameters contained in the registers.

It should be noted that, in some embodiments, the determination by OS 250 that an improper exit occurred may be made independently of the decision made by determining instructions 230. Regardless, in situations in which OS 250 determines that it did not exit properly, the value of stored indication 245 may also indicate to BIOS 220 that OS 250 did not exit properly. Accordingly, BIOS 220 may allow OS 250 to access display device 215 by, for example, executing the functions corresponding to a received interrupt request.

OS 250 may further include instructions for customized information capture 260 for obtaining user-specific information to be displayed in BIOS productivity display 235. In particular, OS 250 may include built-in functionality for capturing customized information for a particular user. As an example, capture instructions 260 may automatically run as a background process to obtain the information detailed above in connection with BIOS productivity display 126 of FIG. 1 (e.g., a calendar, task list, etc.). As another example, capture instructions 260 may be in the form of a standalone application that monitors the user's activity or receives input from the user to obtain this information. As yet another alternative, capture instructions 260 may be incorporated into a particular program executed by OS 250 (e.g., additional instructions included in an email client, web browser, etc.).

Display device driver 265 may include a series of instructions executed by OS 250 to allow applications running in OS 250 to interact with display device 215. OS 250 may load and initialize display device driver 265 during a boot-up procedure after BIOS 220 passes execution to OS 250. As described in detail above, prior to initialization of display device driver 265, OS 250 may output information to display device 215 through the use of interrupt requests sent to BIOS 220.

Exit procedure 270 may include a series of instructions executed by OS 250 upon a proper OS exit triggered automatically or by user 290. For example, exit procedure 270 may include instructions for initiating a shutdown, restart, or hibernation of computing device 200. In some embodiments, when exit procedure 270 executes instructions for restarting computing device, exit procedure 270 may call an Advanced Configuration and Power Interface (ACPI) function of BIOS 220, which may, in turn, include modifying instructions 240. Similarly, when exit procedure executes instructions for initiating shutdown or hibernation of computing device 200, exit procedure 270 may call a System Management Interrupt (SMI) callback function of BIOS 220, which may, in turn, include modifying instructions 240.

In this manner, exit procedure 270 may ensure that the value of stored indication 245 is modified upon a proper shutdown of OS 250. In contrast, in the event of an improper shutdown, such as a loss of power or hard reset, exit procedure 270 would not be executed, in which case stored indication 245 would contain the same value upon a subsequent boot-up.

Output device 280 may be a hardware device for outputting data to a user, such as a monitor, liquid crystal display (LCD) screen, or an electronic ink display. It should be apparent, however, that any suitable display may be used, provided that BIOS productivity display 235 and recovery display 255 are displayed to user 290. Output device 280 may be internal or external to computing device 200 depending on the configuration of computing device 200.

Input device 285 may include a mouse, a keyboard, a touchpad, and/or a microphone. It should be apparent, however, that any suitable input device may be used, provided that user 290 may communicate instructions to computing device 200. Input device 285 may be internal or external to computing device 200 depending on the configuration of computing device 200.

Figure 3:
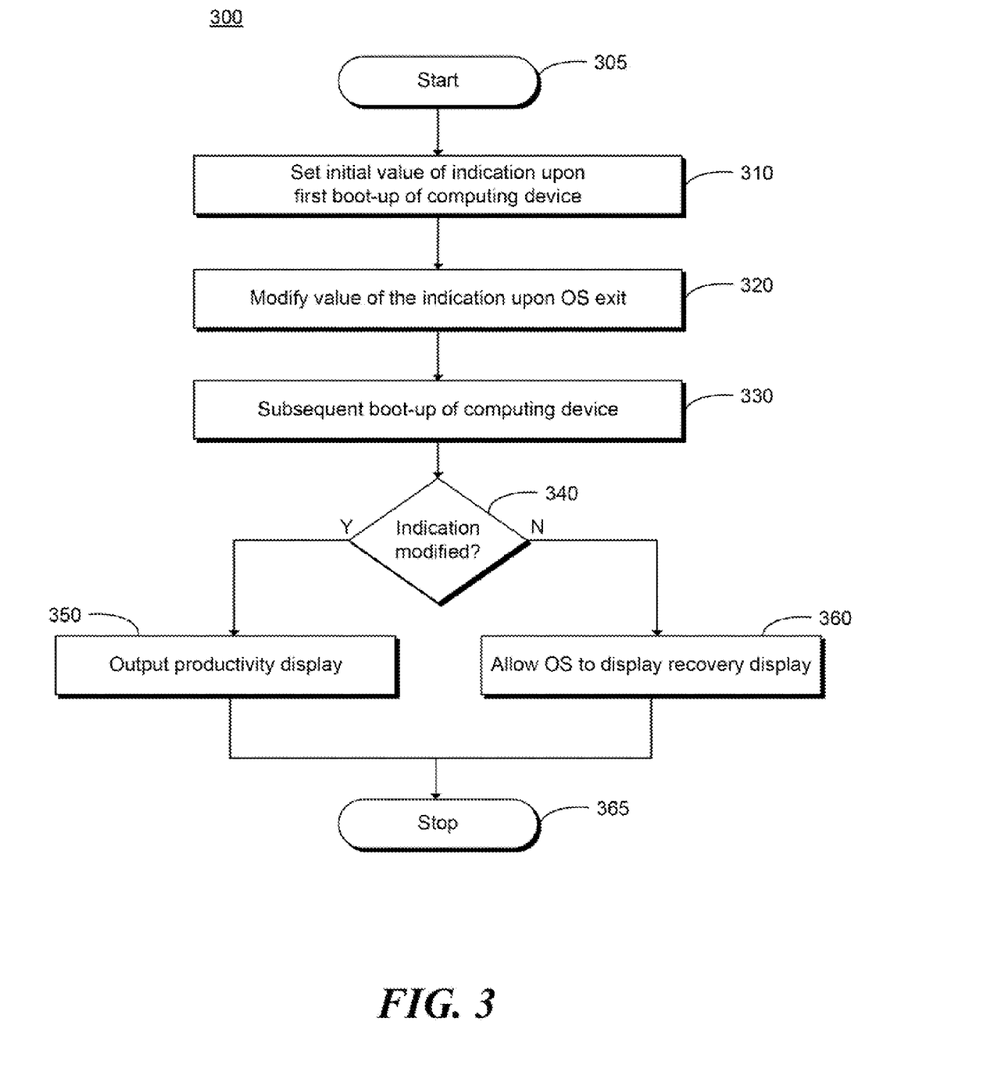
FIG. 3 is a flowchart of an example of a method for selectively displaying a BIOS productivity display during boot-up of a computing device.

FIG. 3 is a flowchart of an example of a method 300 for selectively displaying a BIOS productivity display during boot-up of a computing device. Although execution of method 300 is described below with reference to the components of computing device 100, other suitable components for execution of method 300 will be apparent to those of skill in the art. Method 300 may be implemented in the form of executable instructions stored on a machine-readable storage medium, such as machine-readable storage medium 120 of FIG. 1.

Method 300 may start in block 305 and proceed to block 310, where computing device 100 may set an initial value of a stored indication upon a first boot-up of the computing device. As an example, computing device 100 may include a BIOS routine for setting the value of the stored indication to a default value (e.g., a value of "1" in a CMOS bit, a value of "true" in a Boolean value, etc.). During subsequent boots, computing device 100 may also reset the value of the stored indication to the default value after execution of blocks 340, 350, and 360, described in detail below.

After setting the value of the stored indication, method 300 may proceed to block 320, where computing device 100 may modify the value of the stored indication upon a proper operating system exit. As an example, an OS exit procedure may be executed upon restart, shutdown, or hibernation of computing device 100. Such an OS exit procedure may include calls to a BIOS function for modifying the value of the stored indication. As another example, the OS exit procedure may directly modify the value of the stored indication (e.g., changing a value stored in a location on the hard drive). As should be apparent, when the OS does not exit properly due to a power failure, hard restart, or similar event, the OS exit procedure will not be executed and the value of stored indication will remain the same as when initialized in block 310.

Method 300 may then proceed to block 330, where a subsequent boot-up of computing device 100 may occur. Such a boot-up may occur, for example, immediately after restart of computing device 100, upon power-on by a user, or upon awakening from a hibernation or sleep state.

During the subsequent boot-up, method 300 may proceed to block 340, where a BIOS of computing device 100 may determine whether the stored indication has been modified since the previous boot-up. As one example, the instructions of the BIOS may be programmed such that the BIOS is aware of the value used to initialize the stored indication in block 310. In this manner, the BIOS may compare the programmed value to the current value of the stored indication to determine whether the indication was modified. Other suitable methods for determining whether the stored indication was modified will be apparent to those of skill in the art.

When it is determined in block 340 that the indication was modified, method 300 may proceed to block 350, where computing device 100 may output a BIOS productivity display. As described in detail above in connection with BIOS productivity display 126 of FIG. 1, the BIOS productivity display may include any text and/or images of utility or aesthetic value to the user of computing device 100. Examples of such a display are described in further detail above. After output of the BIOS productivity display, method 300 may then proceed to block 365, where method 300 may stop.

Alternatively, when it is determined in block 340 that the indication was not modified, method 300 may proceed to block 360, where computing device 100 may output an OS recovery display. As described in detail above in connection with OS recovery display 128 of FIG. 1, the recovery display may include a selection of options to be presented to the user for rebooting of the OS (e.g., restore in safe mode, boot normally, etc.) or options for repairing or otherwise restoring the operating system. After output of the OS recovery display, method 300 may then proceed to block 365, where method 300 may stop.

Figure 4A:
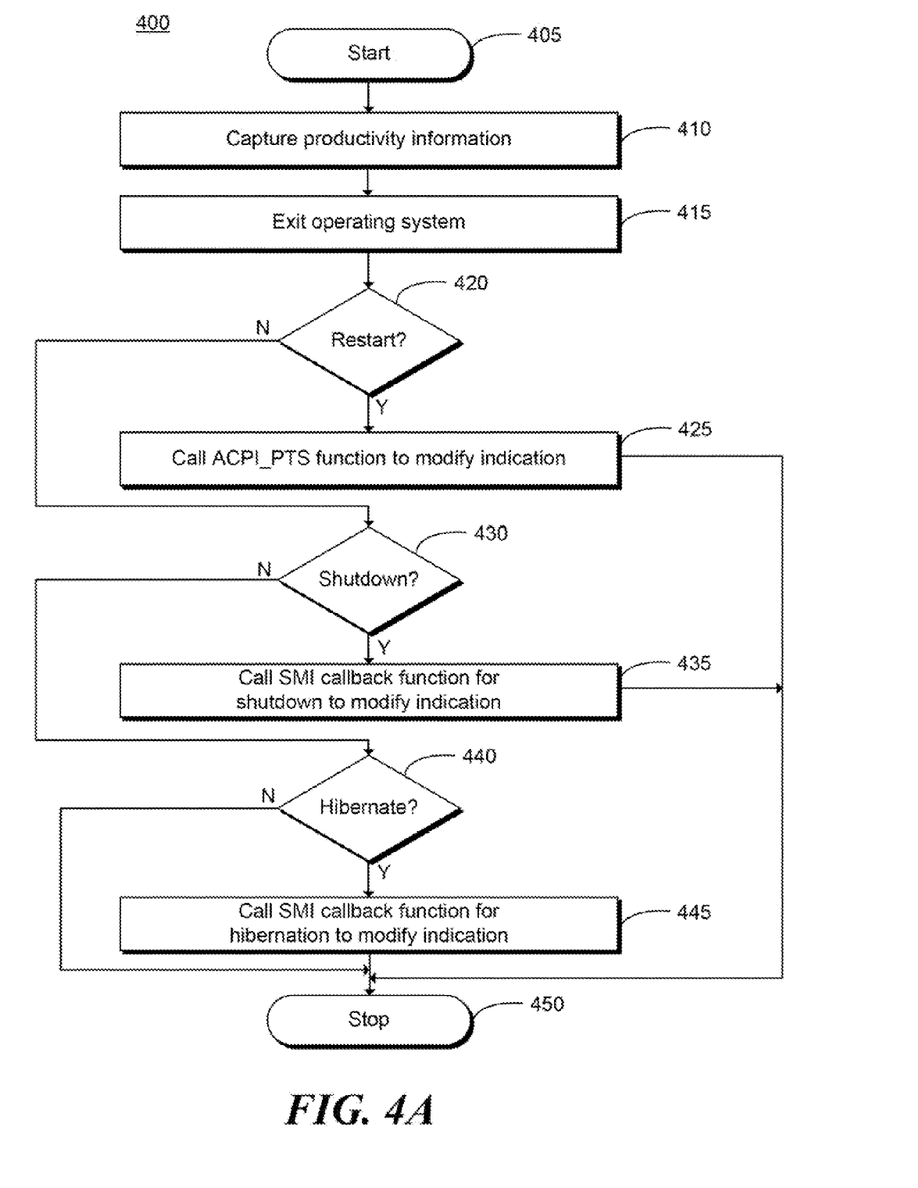
FIG. 4A is a flowchart of an example of a method for capturing productivity information and modifying a stored indication as executed from an operating system of a computing device.

FIG. 4A is a flowchart of an example of a method 400 for capturing productivity information and modifying a stored indication as executed from an operating system 250 of a computing device 200. Although method 400 is described below with reference to the components of computing device 200 and, more specifically, operating system 250, other suitable components for execution of method 400 will be apparent to those of skill in the art. Method 400 may be implemented in the form of executable instructions stored on a machine-readable storage medium included in or otherwise accessible to computing device 200.

Method 400 may start in block 405 and proceed to block 410, where computing device 200 may capture productivity information during execution of OS 250. In particular, as described in detail above in connection with instructions for customized information capture 260, instructions incorporated in OS 250 or another application running in OS 250 may obtain customized information to be outputted in the BIOS productivity display. Examples of such information are described in further detail above.

Method 400 may then proceed to block 415, where OS 250 of computing device 200 may receive an exit instruction. Method 400 may then proceed to determine whether the exit instruction is a restart, shutdown, or hibernation command. It should be noted, prior to description of a number of possible OS exit scenarios, that execution of blocks 415 to 445 will not occur during an improper exit from OS (e.g., power loss, hard restart, etc.).

In block 420, OS 250 may determine whether the exit instruction is a command to restart computing device 200. If so, method 400 may proceed to block 425, where OS 250 may execute a procedure to restart computing device 200. The restart procedure may include, for example, a call to an ACPI Prepare to Sleep (ACPI_PTS) function provided by BIOS 220. BIOS 220 may then modify the stored indication during execution of the ACPI_PTS function by, for example, modifying the value of a CMOS bit. Method 400 may then proceed to block 450, where method 400 may stop.

If the exit instruction is not a restart command, method 400 may proceed to block 430. In block 430, OS 250 may determine whether the exit instruction is a command to initiate a shutdown of computing device 200. If so, method 400 may proceed to block 435, where OS 250 may execute a procedure for shutdown of computing device 200. The shutdown procedure may include, for example, a call to an SMI callback function provided by BIOS 220. BIOS 220 may then modify the stored indication during execution of the SMI callback function for shutdown by, for example, modifying the value of a CMOS bit. Method 400 may then proceed to block 450, where method 400 may stop.

Alternatively, if the exit instruction is neither a restart command nor a shutdown command, method 400 may proceed to block 440. In block 440, OS 250 may determine whether the exit instruction is a command to initiate hibernation of computing device 200. If so, method 400 may proceed to block 445, where OS 250 may execute a procedure for hibernation of computing device 200. The shutdown procedure may include, for example, a call to an SMI callback function provided by BIOS 220. BIOS 220 may then modify the stored indication during execution of the SMI callback function for hibernation by, for example, modifying the value of a CMOS bit. Method 400 may then proceed to block 450, where method 400 may stop.

If the exit is not a restart, a hibernation, or a shutdown, the exit from operating system is improper and an exit procedure will not be called by OS 250. For example, upon sudden loss of power to computing device 200, a critical system error, or another similar event, computing device 200 will be powered down without execution of an exit procedure. Accordingly, method 400 may proceed to block 450, where method 400 may stop without modification of the stored indication.

Figure 4B:
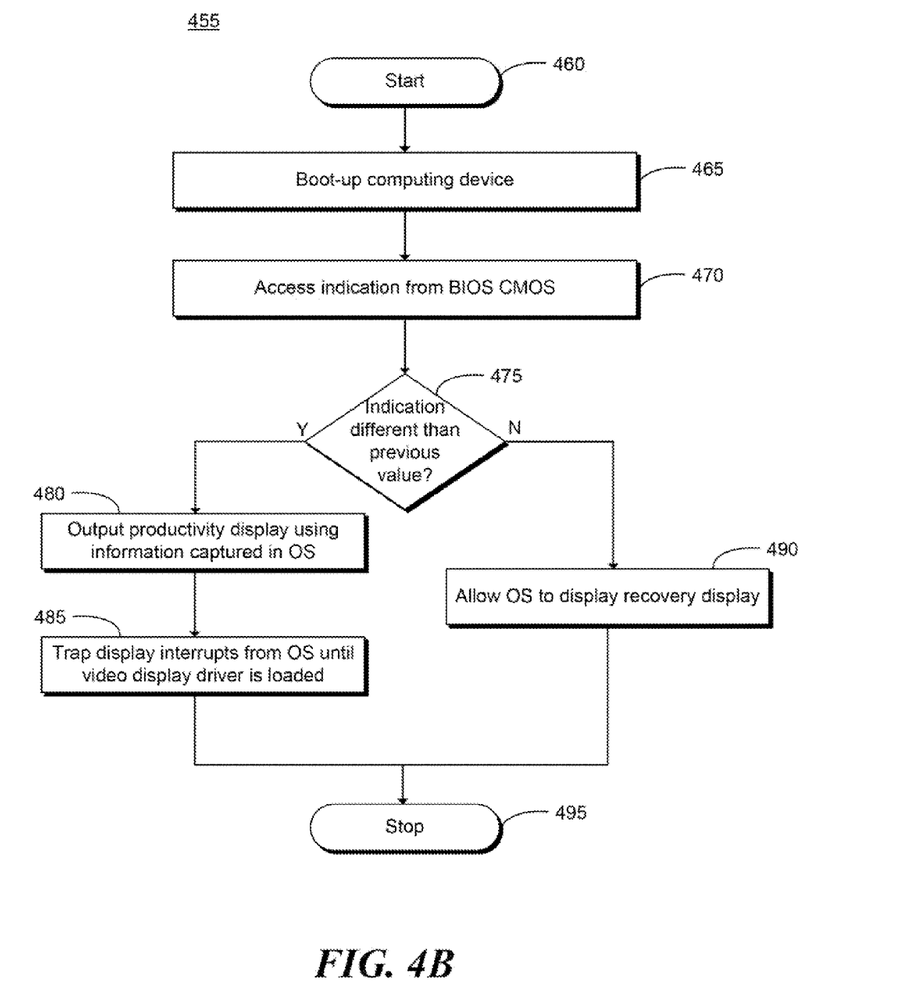
FIG. 4B is a flowchart of an example of a method for selectively displaying a BIOS productivity display during boot-up of a computing device.

FIG. 4B is a flowchart of an example of a method 455 for selectively displaying a BIOS productivity display 235 during boot-up of a computing device 200. Although method 455 is described below with reference to the components of computing device 200 and, more specifically, BIOS 220, other suitable components for execution of method 455 will be apparent to those of skill in the art. Method 455 may be implemented in the form of executable instructions stored on a machine-readable storage medium included in or otherwise accessible to computing device 200.

Method 455 may start in block 460 and continue to block 465, where a user 290 may initiate boot-up of computing device 200. Such a boot-up may occur, for example, upon restart or power-on of computing device 200. Method 455 may then proceed to block 470, where BIOS 220 may access the stored indication to determine whether the value of the indication has been modified since a last boot-up.

When it is determined that the value of the indication has been modified since the last boot-up, method 455 may determine that OS 250 exited properly and proceed to block 480, where BIOS 220 may output a BIOS productivity display 235 using the information captured by OS 250 in block 410 of FIG. 4A. Examples of such information are described in further detail above in connection with BIOS productivity displays 126, 235 of FIGS. 1 and 2. Method 455 may then proceed to block 485, where BIOS 220 may trap or ignore all interrupts requesting access to display device 215 until OS 250 has loaded and initialized a display device driver 265. In this manner, BIOS 220 may ensure that BIOS productivity display 235 is displayed on output device 280 until OS 250 is prepared to control display device 215. Method 455 may then proceed to block 495, where method 455 may stop.

Alternatively, when it is determined in block 475 that the indication has not been modified since the last boot-up, method 455 may determine that OS 250 did not exit properly and proceed to block 490. In block 490, BIOS 220 may allow OS 250 to output recovery display 255 using display device 215. Examples of such a recovery display are described in further detail above in connection with OS recovery displays 128, 255 of FIGS. 1 and 2. In order to allow for output of recovery display 255, BIOS 220 may execute (rather than trap) any interrupt requests sent by OS 250 relating to display device 215. Method 455 may then proceed to block 495, where method 400 may stop.

Figure 5:
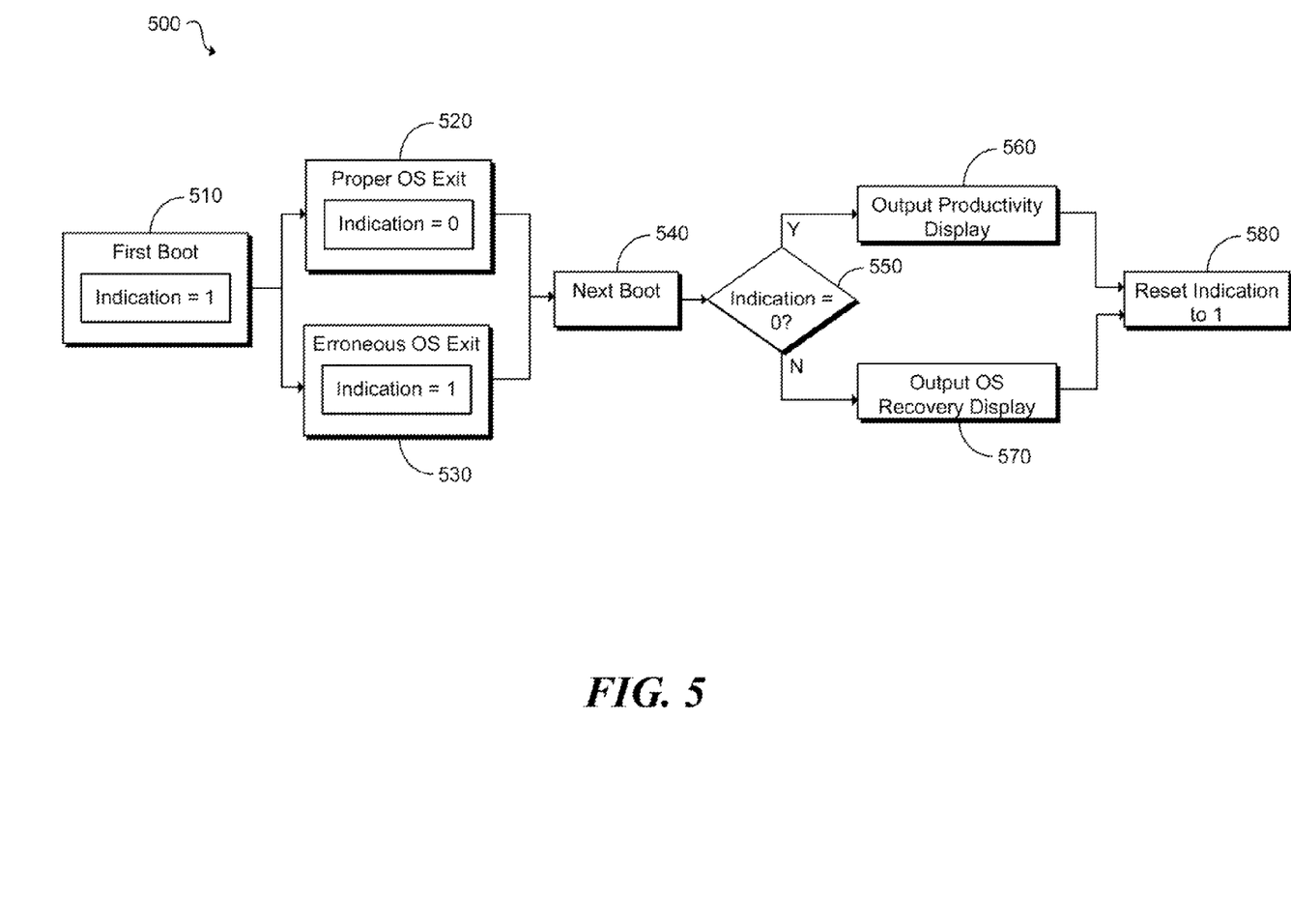
FIG. 5 is a diagram of an example operation flow illustrating the modification of a stored indication and the use of the stored indication to selectively display a BIOS productivity display during boot-up of a computing device.

FIG. 5 is a diagram of an example operation flow 500 illustrating the modification of a stored indication and the use of the stored indication to selectively display a BIOS productivity display during boot-up of a computing device, such as computing device 200 of FIG. 2. As illustrated in state 510, during a first boot, a value of a stored indication accessible to a BIOS of the computing device may be set to "1." Alternatively, the value of the stored indication may be initialized during manufacturing of the computing device, such that a separate procedure for the first boot may be omitted. The indication may be stored, for example, in a CMOS accessible to the BIOS of the computing device. The computing device may then continue to load an OS of the computing device and subsequently pass execution to the OS.

In state 520, after a proper exit from the operating system, the value of the stored indication in the CMOS may be modified to "0" during an exit procedure executed by the OS. In state 530, which may occur after an improper exit from the operating system of the computing device, the value of the stored indication in the CMOS may remain "1."

State 540 represents the next boot of the computing device. During the next boot, the BIOS may determine in state 550 whether the indication is equal to "0." If so, the BIOS may determine that the OS exited properly and that the OS therefore does not require access to the display until the display device driver is loaded. Accordingly, in state 560, the BIOS may output a BIOS productivity display, as described in further detail above.

Alternatively, when the value of the indication is equal to "1," the BIOS may determine that the OS did not exit properly and that the OS therefore requires access to the display device for output of a recovery display. Accordingly, the BIOS may grant access to the OS to the display device by allowing for execution of any BIOS interrupt functions called by the OS.

After output of either the productivity display in state 560 or the recovery display in state 570, the computing device may reset the value of the initialization in state 580. In particular, instructions in the BIOS may set the value of the stored indication in the CMOS to "1." States 520 through 580 may then occur repeatedly for subsequent boots of the computing device.

According to the foregoing, embodiments disclosed herein allow for display of information by either the BIOS or OS depending on the propriety of a previous exit from the OS. In this manner, the BIOS may advantageously display information of value to the user when the OS does not require access to the display, while allowing the OS to access the display device to restore the OS to a proper operating state when the OS did not exit properly.

We claim:

1. A machine-readable storage medium encoded with instructions executable by a processor of a computing device including a display device, the machine-readable storage medium comprising:
    instructions for accessing a stored indication upon boot-up of the computing device using a Basic Input Output System (BIOS);
    instructions for determining, using the stored indication, whether an operating system (OS) of the computing device exited properly;
    instructions for displaying a BIOS productivity display using the display device when it is determined that the OS exited properly, wherein the instructions for displaying maintain control of the display device by ignoring requests from the OS to access the display device until the OS has loaded a driver for the display device; and
    instructions for permitting the OS to display a recovery display using the display device when it is determined that the OS did not exit properly.

2. The machine-readable storage medium of claim 1, wherein the requests to access the display device are interrupt requests issued to the BIOS by the OS.

3. The machine-readable storage medium of claim 1, wherein the BIOS productivity display includes information customized for a user of the computing device.

4. The machine-readable storage medium of claim 3, wherein the information customized for the user includes an image of a calendar captured from a calendar application running in the operating system.

5. The machine-readable storage medium of claim 3, wherein the information customized for the user includes contents entered by the user using an application running in the OS.

6. A computing device comprising:
   a processor;
   a display device; and
   a machine-readable storage medium encoded with instructions executable by the processor, the machine-readable storage medium comprising:
      instructions for modifying a value of an indication accessible to a BIOS of the computing device in an exit procedure executed by an operating system (OS) of the computing device,
      instructions for determining, by a Basic Input Output System (BIOS) upon boot-up of the computing device, whether the value of the indication has changed since last set by the BIOS during a previous boot-up, and
      instructions for maintaining a BIOS productivity display outputted to the display device by ignoring requests from the OS to access the display device when it is determined that the value of the indication has been modified since last set by the BIOS.

7. The computing device of claim 6, wherein the machine-readable storage medium further comprises:
   instructions for allowing the OS to display a recovery display when it is determined that the value of the indication has not been modified since last set by the BIOS.

8. The computing device of claim 7, wherein the OS displays the recovery display by accessing the display device using BIOS interrupt functions.

9. The computing device of claim 6, wherein the instructions for modifying the value of the indication are executed in an Advanced Configuration and Power Interface (ACPI) function upon initiation of a restart of the computing device.

10. The computing device of claim 6, wherein the instructions for modifying the value of the indication are executed in a System Management Interrupt (SMI) callback function for hibernation and shutdown of the computing device.

11. A method for selectively displaying a BIOS productivity display during boot-up of a computing device, the method comprising:
   setting an initial value of an indication accessible to a Basic Input/Output System (BIOS) of the computing device;
   modifying, by the computing device, the value of the indication when an exit procedure of an operating system (OS) of the computing device is executed;
   determining, upon a subsequent boot-up of the computing device, whether the value of the indication has been modified from the initial value;
   displaying a BIOS productivity display when it is determined that the indication has been modified, wherein the displaying comprises maintaining control of a display device by ignoring requests from the OS to access the display device unto the OS has loaded a driver for the display device; and
   allowing the OS to access the display device of the computing device to display a recovery display when it is determined that the indication has not been modified from the initial value.

12. The method of claim 11, wherein the indication is stored in a Complementary Metal Oxide Semiconductor (CMOS) accessible to the BIOS.

13. The method of claim 11, wherein the indication is stored in a predetermined location of a storage medium of the computing device.

14. The method of claim 11, wherein modifying the value of the indication is performed by the BIOS of the computing device during a shutdown, restart, or hibernation function initiated by the OS.

* * * * *

UNITED STATES PATENT AND TRADEMARK OFFICE
CERTIFICATE OF CORRECTION

PATENT NO. : 8,312,256 B2
APPLICATION NO. : 12/711498
DATED : November 13, 2012
INVENTOR(S) : Baraneedharan Anbazhagan et al.

It is certified that error appears in the above-identified patent and that said Letters Patent is hereby corrected as shown below:

In column 12, line 20, in Claim 11, delete "unto" and insert -- until --, therefor.

Signed and Sealed this
Ninth Day of April, 2013

Teresa Stanek Rea
*Acting Director of the United States Patent and Trademark Office*